(12) United States Patent
Yamaguchi

(10) Patent No.: US 6,363,064 B1
(45) Date of Patent: Mar. 26, 2002

(54) ATM-BASED PRIVATE NETWORK HAVING SHORT-CUT SPEECH PATH AND TRANSIT SIGNALING PATH

(75) Inventor: Yasuhiro Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/090,275

(22) Filed: Jun. 4, 1998

(30) Foreign Application Priority Data

Jun. 4, 1997 (JP) .............................................. 9-145666

(51) Int. Cl.[7] .............................................. H04L 12/66
(52) U.S. Cl. ...................................... 370/352; 370/397
(58) Field of Search ................................ 370/352, 353, 370/354, 395, 397, 399, 466, 474, 476, 473

(56) References Cited

U.S. PATENT DOCUMENTS

| 5,379,293 | A | * | 1/1995 | Kanno et al. ................ 708/206 |
| 5,757,775 | A | * | 5/1998 | Yokoyama et al. .......... 370/242 |
| 5,784,371 | A | * | 7/1998 | Iwai ............................ 370/397 |
| 5,926,477 | A | * | 7/1999 | Shirokura et al. ........... 370/395 |
| 6,038,237 | A | * | 3/2000 | Tsuruta et al. ............... 370/468 |
| 6,163,535 | A | * | 12/2000 | Jordan et al. ................ 370/352 |
| 6,243,373 | B1 | * | 6/2001 | Turock ........................ 370/352 |

FOREIGN PATENT DOCUMENTS

| JP | 8-331130 | 12/1996 |
| JP | 9-135250 | 5/1997 |
| JP | 9-284816 | 10/1997 |
| JP | 10-4415 | 1/1998 |
| WO | 97-17785 | * 5/1997 |

* cited by examiner

Primary Examiner—Chau Nguyen
Assistant Examiner—D. Trinh
(74) Attorney, Agent, or Firm—Sughrue Mion, PLLC

(57) ABSTRACT

A private communication network is formed of a source station, a transit station and a destination station are interconnected by transmission mediums. Each station includes a PBX switch, an ATM switch and a cell assembly/disassembly unit connected between the PBX and ATM switches. A call setup message is sent from the PBX switch of the source station to the PBX switch of the transit station, and connections are established in the PBX switch of the transit station according to the call setup message. A call setup message is then sent from the PBX switch of the transit station to the PBX switch of the destination station. Source and destination trunk identification numbers of the source and destination stations associated with the call setup message are exchanged so that all of the stations share the source and destination trunk identification numbers. A short-cut connection is established between the ATM switch of the source station and the ATM switch of the destination station according to the source and destination trunk identification numbers.

9 Claims, 3 Drawing Sheets

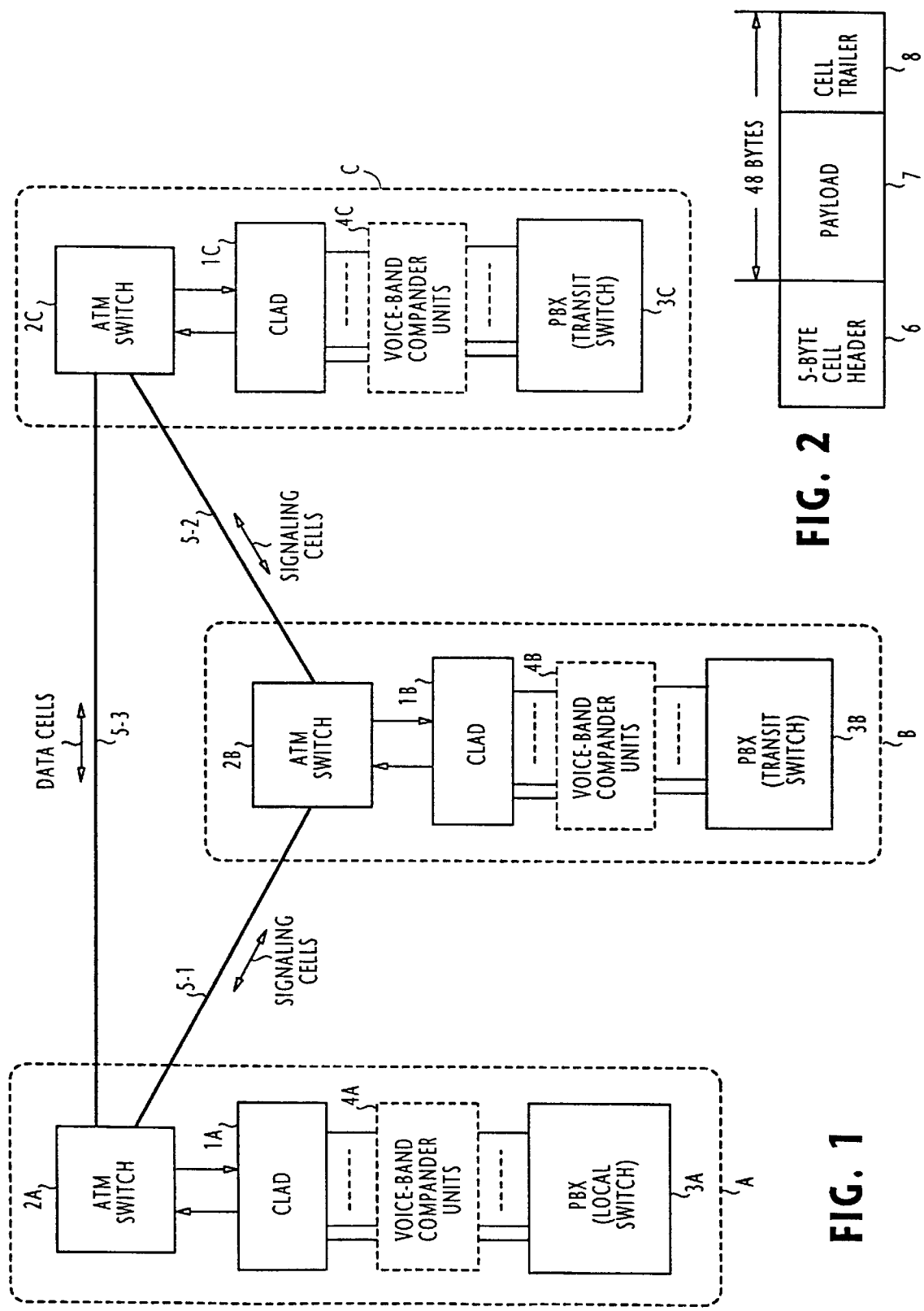

ATM-BASED PRIVATE NETWORK HAVING SHORT-CUT SPEECH PATH AND TRANSIT SIGNALING PATH

BACKGROUND OF THE INVENTION

1. Field of the Invention

The present invention relates to an ATM-based private communication network which is suitable for applications where propagation delays cannot be ignored for quality speech communications.

2. Description of the Related Art

In a known ATM-based private network, communication sites such as business locations each include a PBX switch, an ATM switch and a cell assembly/disassembly unit connected between these switches. The ATM switches of source and destination sites are interconnected via one or more ATM switches or by way of their associated cell assembly/disassembly unit and the PBX switch. However, if no direct, short-cut path exists between the source and destination station, speech signals over the transit path experience long processing delay associated with cell assembly and disassembly, which is typically 30 milliseconds for each station. If voice-band compander (compression/expansion) is used for PCM speech signals, an extra amount of delays would be added. In addition to the end-to-end propagation delay, there is a delay variation factor that must be taken into account for quality speech communication. Thus, it is important to avoid routes having long delays and delay variations. Although delay variations may be absorbed by the use of buffers, best route selection is still a problem.

SUMMARY OF THE INVENTION

It is therefore an object of the present invention to provide an ATM-based private communication network in which processing delays and delay variations are reduced and which allows best routes to be selected.

According to a first aspect of the present invention, there is provided a communication network comprising source and destination stations and a transit station interconnected by transmission mediums. Each of the stations comprises a PBX switch, an ATM switch connected via the transmission mediums to ATM switches of other stations, and a cell assembly/disassembly unit connected between the PBX switch and the ATM switch, the unit controlling the PBX switch and the ATM switch to transfer a voice signal over a short-cut connection between the source and destination stations and transfer control signals through the PBX switch of the transit station.

According to a second aspect, the present invention provides a cell assembly/disassembly unit for interfacing between a PBX switch and an ATM switch connected to another ATM switch by a transmission medium. The cell assembly/disassembly unit comprises means for formulating a trunk identification number in an ATM cell according to ATM cell format and transmitting the cell to the network and means for receiving ATM cells from the network and extracting source and destination trunk identification numbers from the received ATM cells. A mapping table provides mapping of a plurality of trunk terminals of the PBX switch to a plurality of corresponding VPIs/VCIs. A controller is provided for looking up the mapping table with the received source and destination trunk identification numbers to obtain a VPI/VCI value and formulating a command message in an ATM cell containing the VPI/VCI value and supplying the ATM cell to the ATM switch.

According to a third aspect, the present invention provides a cell assembly/disassembly unit for interfacing between a PBX switch and an ATM switch, comprising a bit insertion circuit connected to an incoming trunk terminal of the PBX switch for inserting each bit of a bit sequence identifying the incoming trunk terminal into a least significant bit position of digital signal at the incoming trunk terminal, an extraction circuit connected to an outgoing trunk terminal of the PBX switch for extracting the bit sequence, and a controller connected to the extraction circuit for establishing a relationship between a call and the incoming and outgoing trunk terminals when a connection is established in the PBX switch between the incoming and outgoing trunk terminals.

According to a fourth aspect of the present invention, there is provided a method for a communication network, wherein the network includes a source station, a transit station and a destination station interconnected by transmission mediums, each of the stations including a PBX switch, an ATM switch and a cell assembly/disassembly unit connected between the PBX and ATM switches. According to the method, a call setup message is sent from the PBX switch of the source station to the PBX switch of the transit station, and connections are established in the PBX switch of the transit station according to the call setup message, and a call setup message is sent from the PBX switch of the transit station to the PBX switch of the destination station. Source and destination trunk identification numbers of the source and destination stations associated with the call setup message are exchanged so that all of the stations share the source and destination trunk identification numbers. A short-cut connection is established between the ATM switch of the source station and the ATM switch of the destination station according to the source and destination trunk identification numbers.

BRIEF DESCRIPTION OF THE DRAWINGS

The present invention will be described in further detail with reference to the accompanying drawings, in which:

FIG. 1 is a schematic block diagram of an ATM-based private communication network according to the present invention;

FIG. 2 is an illustration of a cell format according to the present invention;

DETAILED DESCRIPTION

Figure 3:
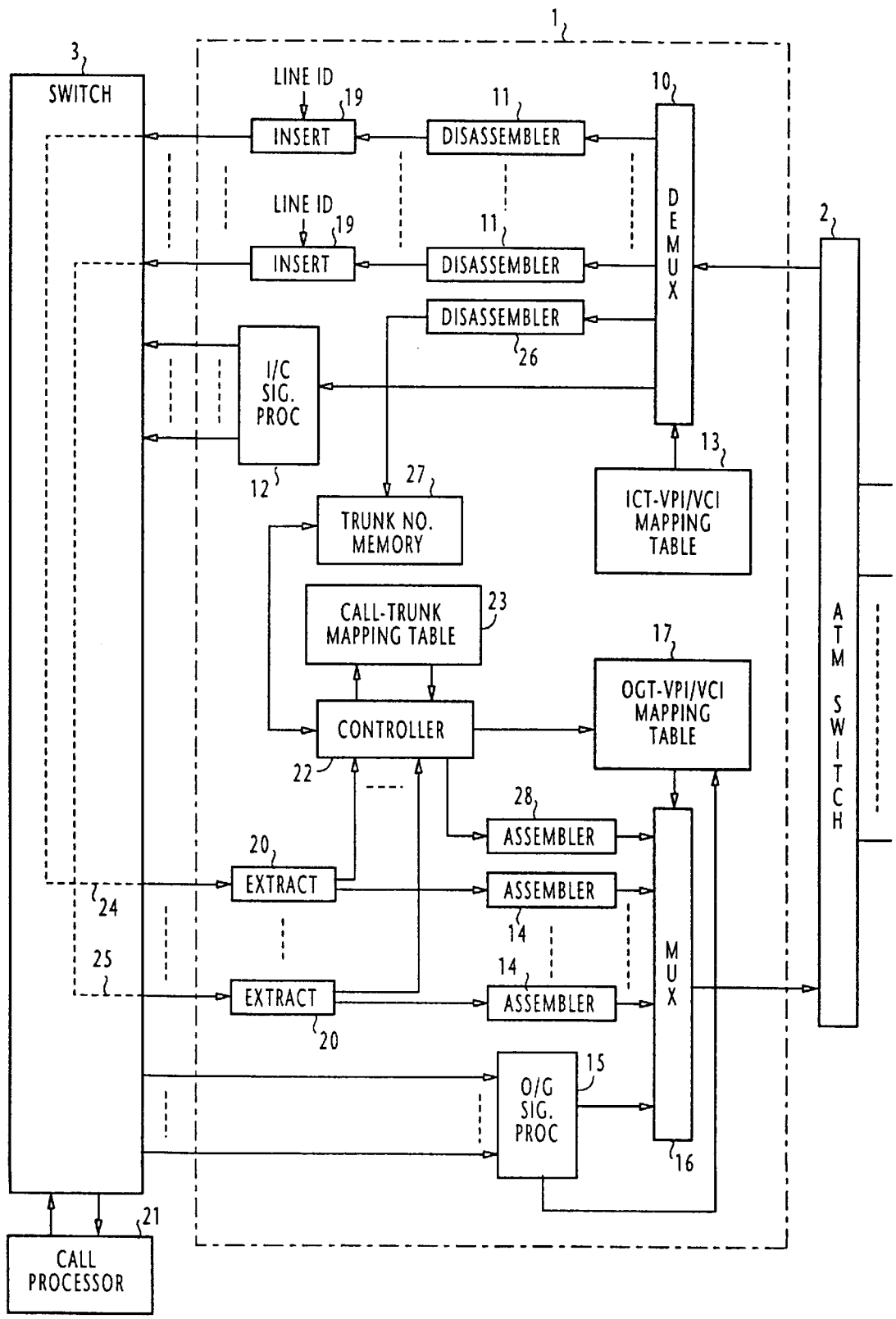
FIG. 3 is a block diagram of a cell assembly/disassembly unit of the present invention.

Referring to FIG. 1, there is shown an ATM-based private communication network according to the present invention. The network is formed of a plurality of business locations or communication sites A and B and C, each comprising a cell assembly/disassembly unit 1 connected between an ATM (asynchronous transfer mode) switch and a private digital telephone switching system or PBX (private branch exchange) 3 to which user terminals are connected. As an option, each communication site may include voice-band compander (compressor/expander) units 4 for converting 64 kbps voice-band digital signal to a compressed digital signal at 8 kbps or lower, for example, using a high-efficiency voice coding technique, and recovering the original signal by expanding the compressed digital signal. The ATM switches 2A, 2B and 2C at the business sites are interconnected by communication links 5-1, 5-2 and 5-3 which are established in the ATM switch 2B by permanent virtual connections (PVC) or switched virtual connections (SVC). Communication links 5-1 and 5-2 carry signaling cells between business sites A and C, while link 5-3 carries speech data cells of the A-to-C communication. Thus, for signaling messages the PBXs 3A and 3C operate as local switches and the PBX 3B as a transit switch.

The ATM cell used in the network carries a cell-type indicator for indicating whether it is a data cell or a signaling cell. For this purpose, the 48-byte payload field of the ATM format is modified as shown in FIG. 2 in which the payload field that follows the 5-byte cell header 6 is divided into a payload field 7 and a cell trainer 8 in which the cell-type indicator is inserted.

As illustrated in detail in FIG. 3, the CLAD (cell assembly/disassembly) unit 1 of each PBX site includes a demultiplexer 10 connected to an outgoing terminal of the ATM switch 2 and a plurality of disassemblers 11 connected to the outputs of demultiplexer 10. Demultiplexer 10 is also connected to an incoming trunk (ICT) o VPI/VCI (virtual path identifier/virtual channel identifier) mapping table 13 which is looked up by the demultiplexer 10 for routing an incoming ATM cell from the ATM switch 2 to one of one of the disassemblers 11 according to the VPI/VCI value contained in the cell. In addition, the demultiplexer 10 has the ability to distinguish data cells and control cells from signaling (call setup) cells according to their cell trailer and forwards data cells and control cells to the disassemblers 11 and forwards call setup cells to an incoming signaling processor 12. Each disassembler 11 extracts information from the payload field 7 of each incoming ATM cell. The outputs of the disassemblers 11 are supplied to LSB (least significant bit) monitor and ID insertion circuits 19 which are connected to incoming trunk terminals of the PBX switch 3. Each insertion circuit 19 monitors the incoming time slots of the PBX switch 3 to insert a bit of a predetermined sequence into the LSB position of the time slots in order to identify the incoming trunk.

Incoming signaling processor 12 extracts call request message from the output of demultiplexer 10 and forwards it through one of its output terminals to a call processor 21 via a line terminal of the PBX switch 3. Call processor 21 responds to all call setup messages from the incoming signaling processor 12 to establish connections in the switch 3.

In the case of a transit call from an upstream-side PBX location, the incoming signaling processor 12 receives a call setup cell from this PBX and extracts source and destination addresses and forwards them to the call processor 21 via the switch 3. In response, the call processor 21 selects two outgoing trunks and two incoming trunks of the switch 3 and establishes transit-path connections 24 and 25 in the switch 3 one for each direction of transmission. Call processor 21 hands over the destination address to an outgoing signaling processor 15 in order to extend the transit call to a downstream PBX location. Outgoing signaling processor 15 then consults with an outgoing trunk (OGT) to VPI/VCI mapping table 17 using the destination address to obtain a VPI/VCI value for an outgoing signaling cell. Outgoing signaling processor 15 then formulates and transmits an outgoing call setup cell to a multiplexer 16 in which the VPI/VCI value is inserted into the outgoing call setup cell, which is then launched into the ATM switch 2 and transmitted to the downstream PBX location.

The outgoing trunk terminals of the switch 3 are connected to a plurality of line-identifier extraction circuits 20. Each detector 20 monitors the outgoing time slots of the PBX switch 3 to detect a particular bit sequence from successive least significant bit positions and notifies a controller 22 of the detected bit sequence so that the controller 22 knows the relationship between the transit call and the incoming and outgoing trunk terminals which the call is currently using. This relationship is stored in a call-trunk mapping table 23 to be used by the controller 22 to determine whether or not a call is a transit call. If a connection is established in the switch 3 for a particular call, the controller 22 determines that this call is a transit call if the particular bit sequence of the associated incoming trunk is detected. Controller 22 uses the mapping table 23 to formulate an outgoing control message for the transit call. The control message of this transit call is then assembled into the payload field of this control cell by the assembler 28. Controller 22 commands the OGT-VPI/VCI mapping table 17 to insert an appropriate VPI/VCI value into this control cell by the multiplexer 16.

The bit stealing and line code insertion technique allows the network to operate with significant savings in system alterations which would otherwise be required for adaptation to the numbering plan necessitated by the introduction of ATM switches to existing PBXs.

Further included are a disassembler 26 connected to an output terminal of the demultiplexer 10 to receive a control cell containing trunk number information. This trunk number information is stored into a trunk number memory 27 which is constantly looked up by the controller 22 to determine whether a source trunk number and a destination trunk number have been received from upstream and downstream PBX locations, respectively. If this is the case, the controller 22 formulates a command message and forwards it to an assembler 28 to assemble it into the payload field of a control cell and commands the mapping table 17 to insert an appropriate VPI/VCI value into the control cell in the multiplexer 16 for transmission to the ATM switch 2. This command cell causes the ATM switch 2 to perform a connection setup procedure with ATM switches 2A and 2C to establish the short-cut ATM connection 5-3.

Figure 4A:
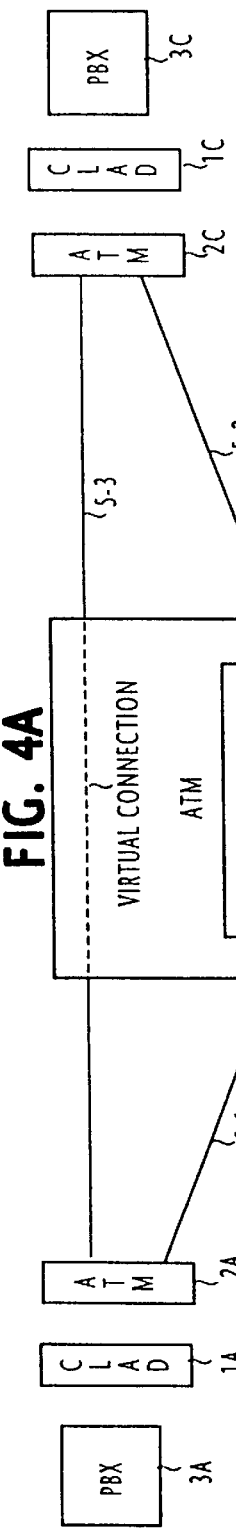
FIGS. 4a and 4b are time sequence diagrams useful for describing the operation of the communication network. of the communication network.
Figure 4B:
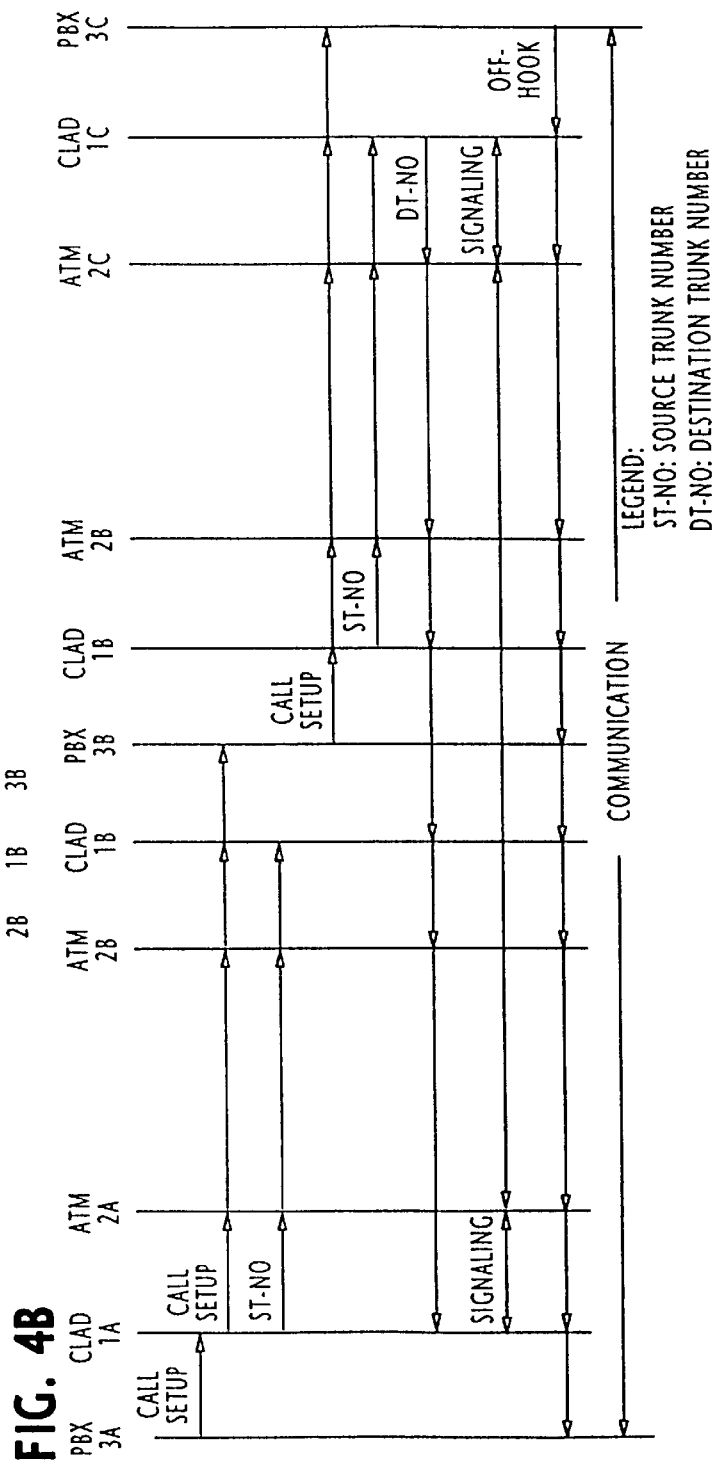

The operation of the CLAD units 1A, 1B and 1C will be explained in more detail below with reference to the time sequence diagrams of FIGS. 4a and 4b.

When a call setup request supplied to the CLAD 1A from the PBX 3A, it formulates and forwards a call setup cell to the ATM switch 2A and thence to the ATM switch 2B which hands it over to the CLAD unit 1B. Call setup message is extracted and supplied from the CLAD unit 1B to the PBX 3B. This call setup message is supplied to the incoming signaling processor 12 of the CLAD 1B. If this call setup message is destined for the PBX 3C, transit-path connections are established as shown in FIG. 3 and the relationship between this transit call and the trunks it uses is detected by the controller 22 and stored into the call-trunk mapping table 23. Following the transmission of the call setup cell from the source CLAD unit 1A, it sends a source trunk number identifying the outgoing trunk used by the call. This source trunk number is assembled in a control cell is transmitted through the ATM switches 2A and 2B to the CLAD unit 1B where it is disassembled by the disassembler 26 and stored in the trunk number memory 27.

As soon as this transit connections are is setup in the switch 3B, the controller 22 of CLAD unit 1B reads the source trunk number from the memory 27 and causes the assembler 28 to formulate a control cell with the source trunk number and commands the OGT-VPI/VCI mapping table 17 to insert an VPI/VCI value into the control cell for transmission through the ATM switches 2B and 2C to the CLAD unit 1C where the source trunk number is extracted and stored into the trunk number memory 27. In response to receipt of the source trunk number, the CLAD unit 1C formulates a control cell with the trunk number of the incoming trunk the transit call is using at the inlet side of the PBX 3C. This control cell is sent as a destination trunk number through the ATM switches 2C and 2B to the CLAD unit 1B where the content of the cell is extracted and passed through the switch 3B to the CLAD unit 1B where it is assembled again into a control cell and transmitted through the ATM switches 2B and 2A to the CLAD unit 1A In this way, all the CLAD units of the network have obtained the source and destination trunk numbers. Controller 22 in each of the CLAD units recognizes this fact by looking up the trunk number memory 27 and causes the associated ATM switch to initiate a connection setup procedure as described above. When the short-cut connection 5-3 is established, the terminating PBX 3C sends a ringing signal to the destination user station. When it answers the call, an off-hook signal is sent from the PBX 3C and relayed through the transit paths 5-2 and 5-1 to the PBX 3A. Speech communication then proceeds between the users at the PBXs 3A and 3C via the short-cut path 5-3.

Since the short-cut path 5-3 bypasses the transit ATM switch 2B, CLAD unit 1B and PBX switch 3B, a substantial amount of reduction in both processing delay and delay variation is achieved. In addition, since speech communication paths can be determined regardless of the locations of communication sites, a best route can be easily selected for quality communications.

What is claimed is:

1. A communication network comprising:
   source and destination stations and a transit station interconnected by transmission mediums, each of the stations comprising:
   a PBX switch;
   an ATM switch connected via said transmission mediums to ATM switches of other stations; and
   a cell assembly/disassembly unit connected between the PBX switch and said ATM switch, said unit controlling said PBX switch and the ATM switch to transfer a voice signal over a short-cut connection between said source and destination stations and transfer control signals through the PBX switch of the transit station;
   wherein said PBX switch includes a plurality of incoming trunk terminals and a plurality of outgoing trunk terminals,
   wherein said cell assembly/disassembly unit of the source station is for transmitting a source trunk identification number, and
   wherein the cell assembly/disassembly unit of the destination station is for transmitting a destination trunk identification number;
   wherein the cell assembly/disassembly units of the source, transit and destination stations are for receiving and store the transmitted source trunk identification number and the cell assembly/disassembly units of the transit and source stations are for receiving the transmitted destination trunk identification number, and
   wherein the cell assembly/disassembly units of the source, transit and destination stations are for causing the associated ATM switch to perform a virtual connection setup procedure with said source and destination trunk identification numbers.

2. A communication network as claimed in claim 1, wherein said short-cut connection is a virtual channel.

3. A communication network as claimed in claim 1, wherein said PBX switch includes a plurality of incoming trunk terminals and a plurality of outgoing trunk terminals, and wherein said cell assembly/disassembly unit is for
   inserting a bit sequence to one of said incoming trunk terminals for identifying said one of the incoming trunk terminals; and
   extracting the bit sequence from one of the outgoing trunk terminals to determine a relationship between a call and associated incoming and outgoing trunk terminals when a connection is established in the PBX switch between the associated incoming and outgoing trunk terminals.

4. A communication network as claimed in claim 1, wherein each of said stations further comprises a voice-band compander connected between the PBX switch and the cell assembly/disassembly unit for compressing digit signals from the PBX switch and expanding signals from the cell assembly/disassembly unit.

5. A communication network as claimed in claim 1, wherein the cell assembly/disassembly unit of each station is for assembling signals into an ATM cell according to ATM cell format, said ATM cell being partitioned into a cell header and a payload field and a cell trailer for identifying the ATM cell.

6. A cell assembly/disassembly unit for interfacing between a PBX switch and an ATM switch connected to another ATM switch by a transmission medium, comprising:
   means for formulating a trunk identification number in an ATM cell according to ATM cell format and transmitting the cell to a network;
   means for receiving ATM cells from the network and extracting source and destination trunk identification numbers from the received ATM cells;
   a mapping table for mapping a plurality of trunk terminals of said PBX switch to a plurality of corresponding VPIs/VCIs; and
   a controller for looking up said mapping table with the received source and destination trunk identification numbers to obtain a VPI/VCI value and formulating a command message in an ATM cell containing the VPI/VCI value and supplying the ATM cell to the ATM switch.

7. A cell assembly/disassembly unit as claimed in claim 6, further comprising:
   a bit insertion circuit connected to an incoming trunk terminal of said PBX switch for inserting each bit of a bit sequence identifying the incoming trunk terminal into a least significant bit position of digital signal at said incoming trunk terminal;

an extraction circuit connected to an outgoing trunk terminal of said PBX switch for extracting the bit sequence; and a controller connected to the extraction circuit for establishing a relationship between a call and the incoming and outgoing trunk terminals when a connection is established in the PBX switch between the incoming and outgoing trunk terminals.

8. A method for a communication network, wherein the network includes a source station, a transit station and a destination station interconnected by transmission mediums, each of said stations including a PBX switch, an ATM switch and a cell assembly/disassembly unit connected between the PBX and ATM switches, the method comprising the steps of:

a) transmitting a call setup message from the PBX switch of the source station to the PBX switch of the transit station;

b) establishing connections in the PBX switch of the transit station according to the call setup message;

c) transmitting a call setup message from the PBX switch of the transit station to the PBX switch of the destination station;

d) exchanging source and destination trunk identification numbers of said source and destination stations associated with said call setup message so that all of said stations share the source and destination trunk identification numbers; and e) establishing a short-cut connection between the ATM switch of said source station and the ATM switch of the destination station according to the source and destination trunk identification numbers.

9. A method according to claim 8, wherein the step (e) comprises establishing a virtual connection between the ATM switch of said source station and the ATM switch of the destination station according to the source and destination trunk identification numbers.

* * * * *